Aug. 24, 1926.
H. NYQUIST ET AL
1,596,942
MEASURING TRANSMISSION PHASE SHIFT
Filed Sept. 1, 1925
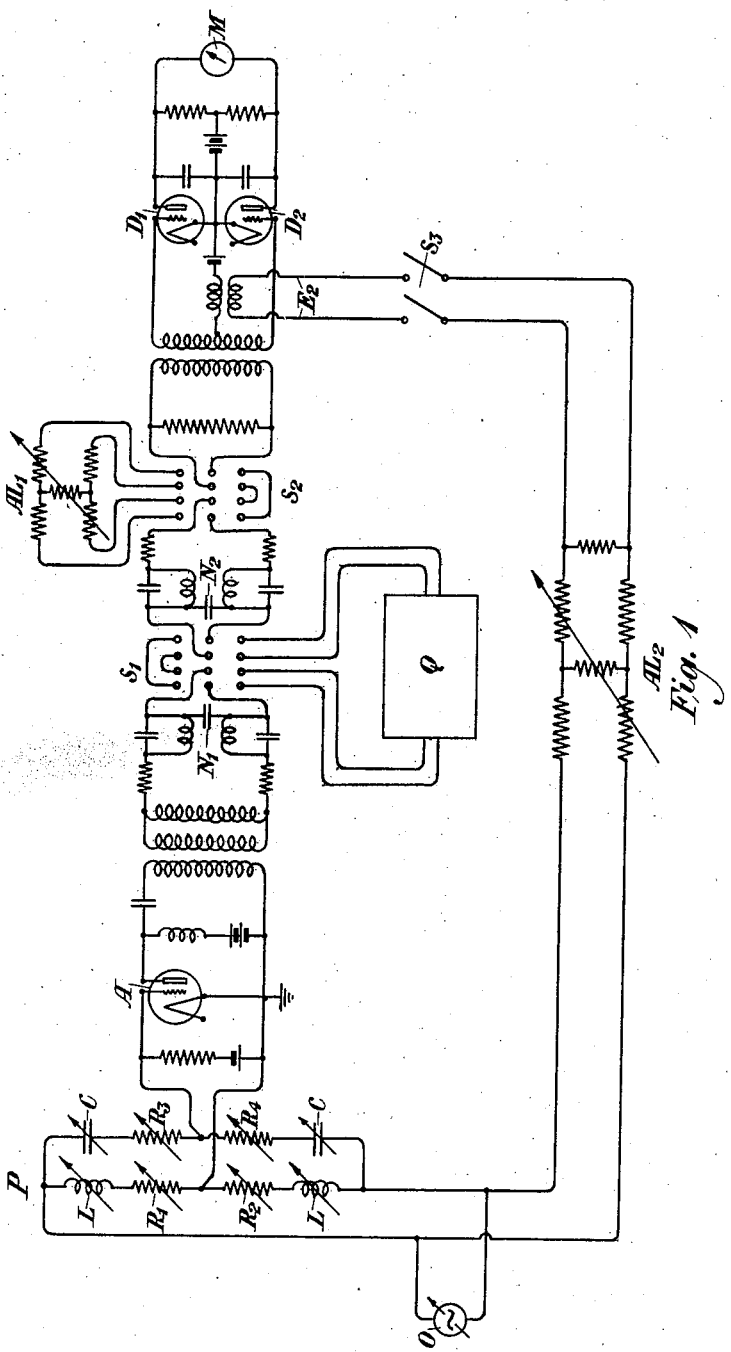
INVENTORS
H. Nyquist and
BY H. A. Etheridge, Jr.
ATTORNEY Patented Aug. 24, 1926.

1,596,942

UNITED STATES PATENT OFFICE.

HARRY NYQUIST, OF MILLBURN, NEW JERSEY, AND HARRY A. ETHERIDGE, JR., OF OSSINING, NEW YORK, ASSIGNORS TO AMERICAN TELEPHONE AND TELEGRAPH COMPANY, A CORPORATION OF NEW YORK.

MEASURING TRANSMISSION PHASE SHIFT.

Application filed September 1, 1925. Serial No. 53,943.

An object of our invention is to provide an improved method and appropriate apparatus for measuring phase shift or delay of transmission through a transducer, and especially in cases where the delay is small such as a minor fraction of a half period. Another object of our invention is to provide for measuring the delay through a given transducer by comparing currents from an oscillator over two paths, one of which comprises the transducer. These currents are brought to a quadrature relation, adn then the phase adjustment necessary to restore that relation when the transducer is removed from its path, gives the measurement of the phase delay that is sought. These objects and other objects of our invention will be better understood and appreciated on consideration of an example according to the invention, which is shown in the accompanying drawings. It will be understood that the following description relates to this example, leaving the invention to be defined in the appended claims.

Referring to the drawings, Figure 1 is a diagram of circuits and associated apparatus by which our invention may be practiced, and Fig. 2 is a vector diagram that will be referred to in explaining the principle of our invention.

From the adjustable oscillator O, two current paths lead to the pair of detectors $D_1$ and $D_2$, arranged in push-pull relation. One path leads through the artificial line $AL_2$ and the switch $S_3$, and by this path the electromotive force $E_2$ is applied equally to the grids of the two detectors $D_1$ and $D_2$. It is evident that the force $E_2$ acting alone will produce a null effect in the detector output meter M. Its effects in the two detector output circuits will be as shown by the vectors O1 and O2 in Fig. 2.

The other path from the oscillator O leads through the phase shifter P and the various elements of apparatus that will be mentioned later, and by this path electromotive force $E_1$ is applied oppositely to the grids of the detectors $D_1$ and $D_2$. Acting alone the force $E_1$ will produce no effect in meter M, because the rectification in one detector will be offset by the rectification in the other.

Further structural features will be pointed out in connection with the following description of the procedure in measuring the delay through a given transducer Q.

With the switch $S_3$ open, the artificial line $AL_1$ is adjusted so as to get the same overall loss whether the switch $S_1$ is thrown up or down; this will require that the switch $S_2$ shall be thrown at the same time. If Q gives a gain, then when switch $S_1$ is down, $S_2$ must be up and vice versa, and in this case the overall loss will be zero, but if Q gives a loss then the switches $S_1$ and $S_2$ must both be up or both down at the same time, and in this case the overall loss will be a positive finite quantity.

The networks $N_1$ and $N_2$ are carefully designed to show the same characteristic impedance looking into them from the transducer Q when the switch $S_1$ is down, as the transducer sees when inserted in the transmission system with which it is to be used. The object is to produce the same reflection effects at the terminals of the transducer as occur when it is inserted in the said transmission system, so that the transmission phase shift determined by this method of measurement will be exactly that caused by inserting the transducer into the said transmission system.

The device P is a phase shifter depending upon the adjustment of its inductance coils L, condensers C and resistances $R_1$, $R_2$, $R_3$ and $R_4$. In order that there may be no reaction on the output side of this phase shifter it is connected to the input of a high-impedance three-electrode vacuum tube A. It is desirable that as adjustment is made in the phase shifter P for the purpose of getting phase shift, there shall be no change in output intensity. A condition to secure this result is that $$4\pi fL = 10^6/\pi fC = R_1 + R_2 = R_3 + R_4$$

If the desired phase shift is $\theta$, the adjustments for $R_1$, $R_2$, $R_3$ and $R_4$ will be given by the following equations in which
$$R = R_1 + R_2 = R_3 + R_4.$$
These equations are:
$$2R_1 = R[1 + \cos(\theta + \pi/4)]$$
$$2R_2 = R[1 - \cos(\theta + \pi/4)]$$
$$2R_3 = R[1 - \sin(\theta + \pi/4)]$$
$$2R_4 = R[1 + \sin(\theta + \pi/4)]$$

By making the adjustments conform to these equations the output is kept of constant intensity and a phase shift is obtained which can be readily ascertained from the calibration of the elements of the phase shifter P.

With the switch $S_3$ closed and with the switch $S_1$ down and $S_2$ in its proper position, the phase shifter P is adjusted until a zero reading is obtained in the meter M. This means that the electromotive forces $E_1$ and $E_2$ are in quadrature and they give a vector diagram like that shown in full lines in Fig. 2, namely O3 and O4. In the detector $D_1$ the electromotive force is O3, the sum of O1 due to $E_2$ and 13 due to $E_1$. Similarly in the detector $D_2$ the electromotive force on the grid is the resultant O4. In magnitude these two resultants O3 and O4 are equal, and therefore the rectified currents in the output circuits are equal and the meter M reads zero.

Any departure from the quadrature relation changes the diagram to that shown by the dotted lines in Fig. 2, where obviously the two resultants O3' and O4' are quite different in magnitude, and hence there is an unbalance between the outputs of the two detectors $D_1$ and $D_2$, and they give a substantial reading in the meter M.

As already explained, the phase shifter P is adjusted so that the full line diagram obtains as in Fig. 2. Next the switch $S_1$ is thrown up and the switch $S_2$ is shifted. This will cause a departure from the quadrature relation that was established before, and the phase shifter P is adjusted until the quadrature relation is restored. By the calibration of the elements of apparatus of the phase shifter P the amount of this last mentioned adjustment is known and therefore the phase delay through the transducer Q is known for the particular frequency of the oscillator O. This phase delay can be obtained at various frequencies of the oscillator O, and thus the phase delay can be plotted as a function of frequency $f$.

It is known that an approximate value for the time delay of signaling on a current of a certain frequency is given by the slope of the curve of phase shift plotted against periodicity ($2\pi$ times the frequency). If this value for signaling delay is desired, such a curve may be readily obtained from the plot of phase shift against frequency $f$, as mentioned above.

We claim:—

1. The method of measuring phase shift through a given transducer, which consists in applying two voltages from an oscillator to a push-pull detector, one voltage through said transducer and the other around it, adjusting the phase of one voltage to get a zero reading from the detector and noting the further phase adjustment necessary to restore this reading when the connection through the transducer is replaced by a direct connection.

2. The method of measuring the phase shift through a given transducer, which consists in comparing two voltages from an oscillator, one voltage through said transducer and the other around it, adjusting the phase of one voltage to get the two voltages in quadrature and noting the further phase adjustment necessary to preserve the quadrature relation when the connection through the transducer is replaced by a direct connection.

3. The method of measuring the phase shift through a given transducer which consists in noting the phase relation between two electromotive forces from the same oscillator, one transmitted through the transducer, the other around it, then substituting a direct connection for the former connection through the transducer, and noting the phase shift necessary to bring the said two electromotive forces again to the same phase relation as before.

4. In combination, an oscillator, a push-pull detector, two connections from the oscillator to the detector input, through one of which the detector grids are affected alike and through the other they are affected oppositely, an adjustable phase shifter in one connection, a transducer whose phase shift is to be measured, and a switch by which to interpose it in one said connection or to cut it out and establish the connection directly.

5. The method of measuring the phase shift through a given transducer which consists in transmitting from an oscillator over two paths and comparing the transmitted currents as to phase relation, one path comprising said transducer, and then noting the measure of the phase shift necessary to be introduced to restore the phase relation when the transducer is removed and the path is made directly instead.

6. In combination, an oscillator, a push-pull detector with its input connected with said oscillator by two paths, a transducer whose phase shift is to be measured in one path, sections of artificial line simulating the impedance of the transmission system in which the transducer is designed to be inserted, a switch to cut out the transducer and connect said sections directly, an adjustable artificial line and a switch to cut it in or out to compensate the gain or loss of the transducer, and an adjustable phase shifter in one of said paths.

In testimony whereof, we have signed our names to this specification this 26th day of August, 1925.

HARRY NYQUIST.
HARRY A. ETHERIDGE, Jr.